June 1, 1954  E. S. LANDGRAF  2,679,957
AUTOMOBILE GARMENT HANGER AND HOOK THEREFOR
Filed Sept. 7, 1951
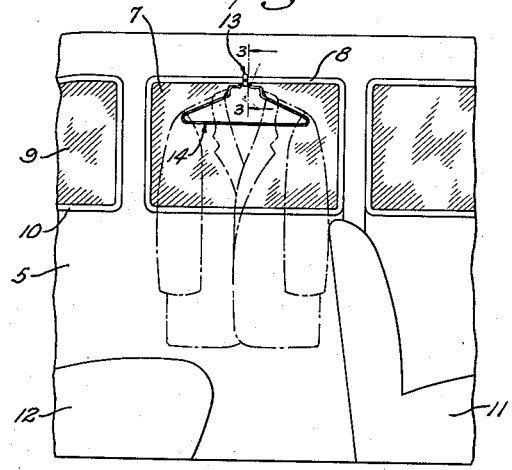
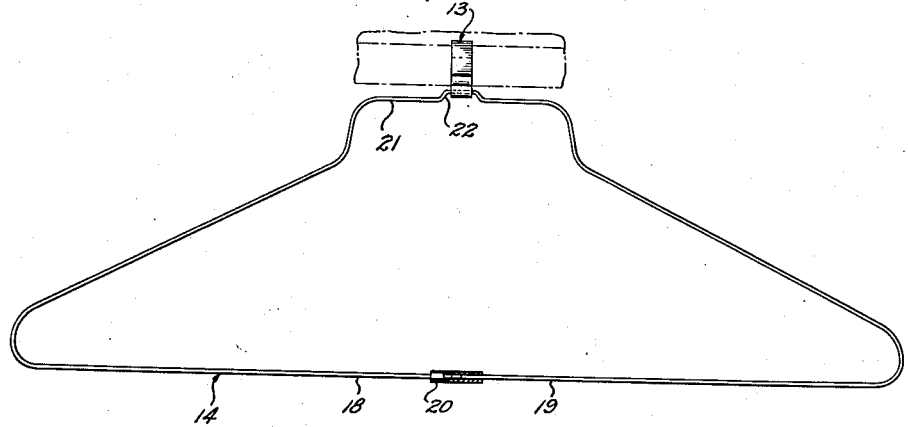
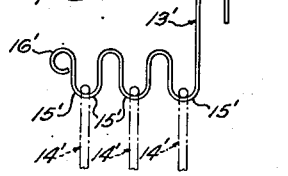
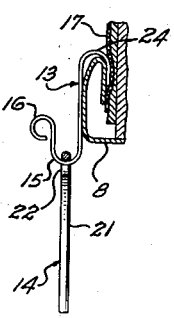
INVENTOR.
Esther S. Landgraf,
BY Morsell & Morsell
ATTORNEYS.

Patented June 1, 1954

2,679,957

UNITED STATES PATENT OFFICE 2,679,957

AUTOMOBILE GARMENT HANGER AND HOOK THEREFOR

Esther S. Landgraf, Sheboygan, Wis.

Application September 7, 1951, Serial No. 245,616

2 Claims. (Cl. 223—88)

1

This invention relates to improvements in automobile garment hangers and hooks therefor.

Hooks of various types have heretofore been devised for the purpose of providing in an automobile a support for conventional coat or garment hangers. The majority of such prior hooks were adapted to be supported by the glass of an automobile window, said hooks having means of either the hook or the suction cup type, for attachment over the upper edge or on the inner surface of window glass. The prior hooks are not entirely satisfactory because of danger occasioned by the undue stress exerted on the window glass when a number of loaded garment hangers are supported thereby. In addition, since the prior hooks were designed for use with conventional hangers, which are formed with elongated upstanding hook portions, the garments on hangers supported by the prior hooks could not hang free since they were not supported sufficiently high to avoid contact with the seat or the portion of the automobile floor therebelow.

With the above in mind, it is the general object of the present invention to provide an improved hanger and hook therefor which can be used in any automobile and which supports a garment on said hanger at a relatively high elevation in the automobile out of contact with the seat or the floor therebelow.

A further object of the invention is to provide an improved hook for automobile garment hangers which hook is formed with a portion positionable over and behind the upper window molding of the automobile in a manner which does not injure the upholstery or place any stress upon the window glass.

A further object of the invention is to provide an improved garment hanger which is made of a single extent of wire formed into a generally triangular shape and having a generally rectangular neck portion at the apex of said triangle, the end portions of the wire forming the base of the triangle and having the tips thereof fixedly inserted into a smooth surfaced connecting sleeve.

A further more specific object of the invention is to provide an improved hanger of the class described wherein the horizontal extent of the neck portion thereof is formed with a raised hook receiving offset, the width of said offset being such as to prevent longitudinal sliding of the offset portion of the hanger in the hook.

A further specific object of the invention is to provide an improved hook of the class described which is formed with a plurality of undulations for removably receiving and supporting a plurality of the improved hangers.

2

With the above and other objects in view, the invention consists of the improved garment hanger and hook therefor and all of their parts and combinations as set forth in the claims, and all equivalents thereof.

In the drawing accompanying and forming a part of this specification, wherein like characters of reference indicate the same parts in all of the views:

Fig. 1 is a fragmentary side elevational view of the interior of an automobile, showing the improved garment hanger and hook supported therein;

Fig. 2 is a side elevational view on an enlarged scale of the improved garment hanger and hook;

Fig. 3 is an enlarged fragmentary vertical sectional view taken approximately along the line 3—3 of Fig. 1; and Fig. 4 is a side elevational view of a modified form of hook which is adapted to support a plurality of the improved hangers.

Referring more particularly to Fig. 1 of the drawing, the numeral 5 indicates the interior of an automobile having a side window 7 provided with an inner window molding 8 surrounding the window 7. A rear side window 9 may also be provided, said window having a molding 10 similar to the molding 8. The automobile 5 is equipped with the usual front seat 11 and rear seat 12.

The numeral 13 indicates the improved hook, and the numeral 14 indicates the improved hanger. Referring to Figs. 2 and 3 the improved hook 13 is preferably made of flat metal band material and has an upper end portion 24 which is reversely bent, as shown in Fig. 3, and is adapted to fit over and behind the upper edge of the window molding 8. The lower end portion of the hook 13 is reversely bent in the opposite direction from the portion 24, as at 15, and the tip thereof may be rolled as at 16. It will be noted that the portion 24 of the hook slips between the back of the molding 8 and the upholstery 17, and it is apparent that there is no danger of said hook harming said upholstery.

Referring to Fig. 3, the improved hanger 14 is preferably formed of a single extent of wire which is formed into a generally triangular shape with the end portions 18 and 19 forming the base of the triangle. The tips of the end portions 18 and 19 are fixedly inserted into a smooth surfaced connecting sleeve 20. The improved hanger 14 is formed with a generally rectangular neck portion 21, the horizontal extent of which is formed centrally with a raised inverted U-shaped offset 22 which is adapted to be engaged in the hook 13. The width of the offset 22 is not substantially wider than that of the hook 13, thereby preventing any substantial longitudinal sliding movement of the hanger in the hook.

Fig. 4 shows a modified form of a hook 13' which is similar to the hook 13 except that it is formed with a plurality of undulations 15' in which a plurality of hangers 14' are adapted to be received.

As is apparent from Fig. 1, the improved hook and hanger support a garment in an automobile in freely hanging position out of contact with the seat and floor therebelow. The improved hook is itself supported in the automobile in a higher position than conventional window hooks can be supported, and it places no stress whatever upon the window glass. In addition, the improved hanger, by having its neck portion positioned in the hook 13 rather than spaced therebelow by an elongated hook of the type found in conventional hangers, further heightens the supported position of the garment in the automobile.

A further departure from conventional hanger design is found in the elimination of the twisted connection of the ends of the conventional hanger. The rough edges provided by such a connection are eliminated by the use of the improved connecting sleeve 20 which avoids the fraying of the garment lining which frequently results from the twisted type of connection.

Various changes and modifications may be made without departing from the spirit of the invention, and all of such changes are contemplated as may come within the scope of the claims.

What I claim as new is:

1. In combination: a hook of flat metal band material having a pair of spaced apart upper and lower oppositely opening U-shaped portions connected by an intermediate rectilinear portion, the upper U-shaped portion being adapted to be positioned over and behind the window molding of an automobile with the rectilinear portion of the hook firmly engaging a face portion of said window molding; and a garment hanger removably supported on the lower U-shaped portion of said hook, said hanger being made of a generally triangular loop of material having an upstanding generally rectangular neck portion at the apex thereof, said neck portion having a height sufficient to extend through but not substantially above the neck portion of a garment hung thereon, said neck portion being formed with an upwardly offset horizontal central portion removably positioned in the lower U-shaped portion of said hook, said offset portion being substantially the same width as the U-shaped portion of the hook in which it is positioned whereby transverse sliding movement of said hanger or tilting thereof on the hook is prevented.

2. In combination: a hook of flat metal band material having an upper, downwardly opening U-shaped portion adapted to be positioned over and behind the window molding of an automobile and also having a depending rectilinear portion firmly engaging a face portion of said window molding, the rectilinear portion of the hook also having extending therefrom substantially below the upper U-shaped portion an oppositely directed undulous portion; and a plurality of garment hangers removably and spacedly supported on the undulous portion of said hook, each hanger being formed of a generally triangular loop of material having an upstanding generally rectangular neck portion at the apex thereof, said neck portion having a height sufficient to extend through but not substantially above the neck portion of a garment hung thereon, said neck portion being formed with an upwardly offset horizontal central portion removably positioned on a selected undulous portion of the hook, said offset portion being substantially the same width as the portion of the hook on which it is mounted whereby transverse sliding movement of said hanger or tilting thereof on the hook is prevented.

References Cited in the file of this patent

UNITED STATES PATENTS

| Number | Name | Date |
|---|---|---|
| 888,819 | Kemper | May 26, 1908 |
| 915,494 | Smith | Mar. 16, 1909 |
| 1,574,065 | Coney | Feb. 23, 1926 |
| 1,626,210 | Phillips | Apr. 26, 1927 |
| 1,886,574 | Normandy | Nov. 8, 1932 |
| 2,032,246 | Baum | Feb. 25, 1936 |
| 2,117,178 | Klein | May 10, 1938 |
| 2,344,339 | Zwald | Mar. 14, 1944 |
| 2,557,537 | Ellison | June 19, 1951 |